(No Model.) 2 Sheets—Sheet 1.

S. V. ESSICK.
ELECTRICAL GENERATOR.

No. 579,707. Patented Mar. 30, 1897.

Witnesses
J. G. Hinkel
A. E. Hansmann

Inventor
S. V. Essick
by Foster Freeman
Attorney

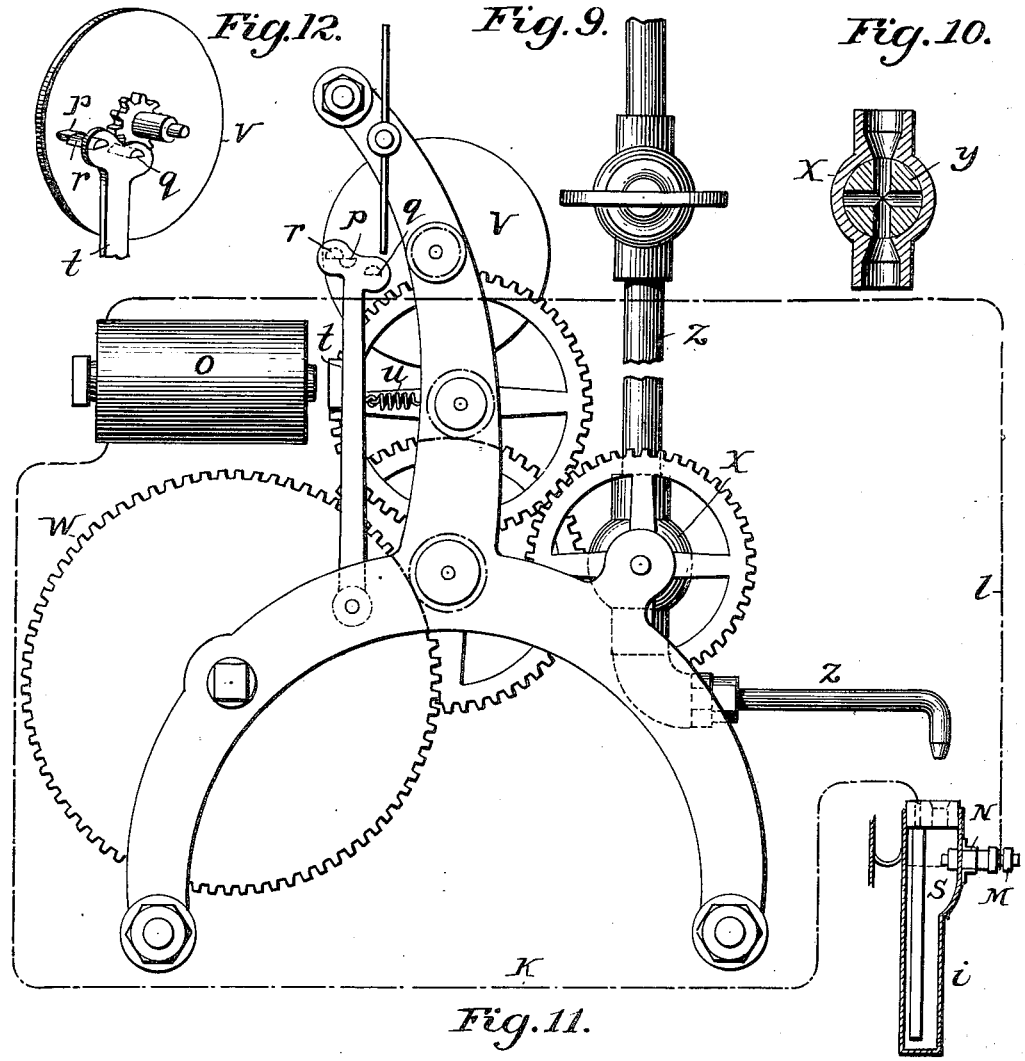

UNITED STATES PATENT OFFICE.

SAMUEL V. ESSICK, OF YONKERS, NEW YORK.

ELECTRICAL GENERATOR.

SPECIFICATION forming part of Letters Patent No. 579,707, dated March 30, 1897.

Application filed May 14, 1896. Serial No. 591,520. (No model.)

*To all whom it may concern:*

Be it known that I, SAMUEL V. ESSICK, a citizen of the United States, and a resident of Yonkers, in the county of Westchester and State of New York, have invented a new and useful Improvement in Electrical Generators, of which the following is a specification.

My invention relates to electric generators in which the positive and negative elements are in contact with a single battery liquid or electrolyte and the same is subjected to heat sufficient for depolarization, and means are provided for automatically keeping the liquid-supply in the generator.

The object of the invention is to produce a constant electric current by a simple apparatus and at a small cost; and to these ends my invention consists in the various features of construction and arrangement of parts substantially as hereinafter set forth.

Figure 1:
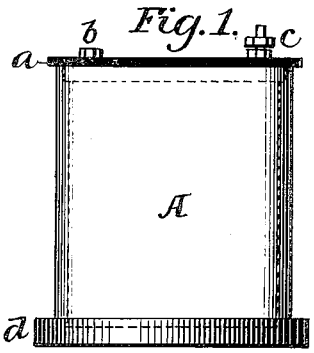
Figure 2:
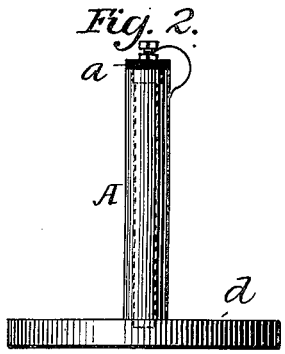
Figure 3:
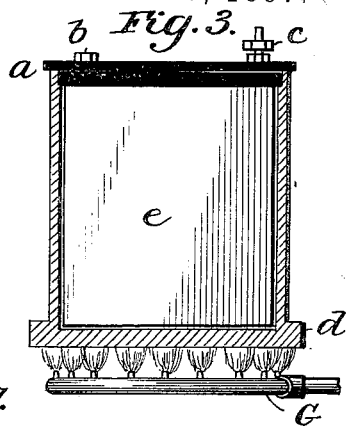
Figure 4:
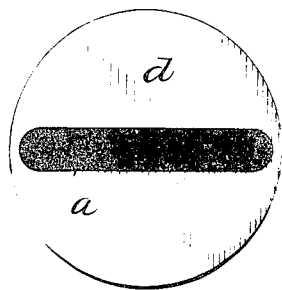
Figure 5:
Figure 6:
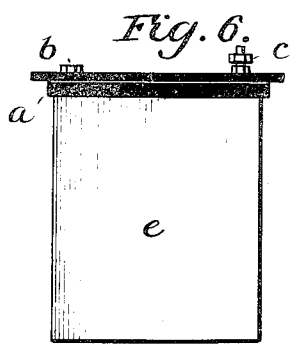
Figure 7:
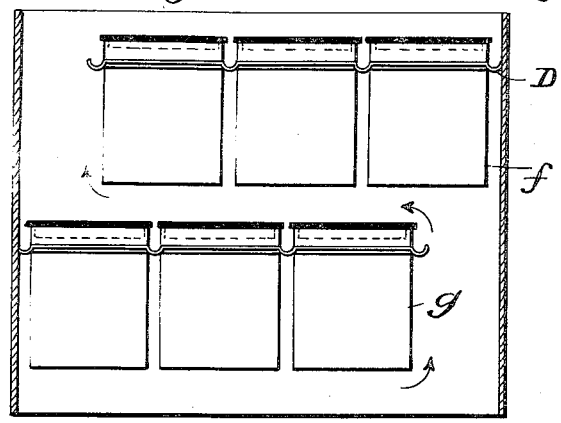
Figure 8:
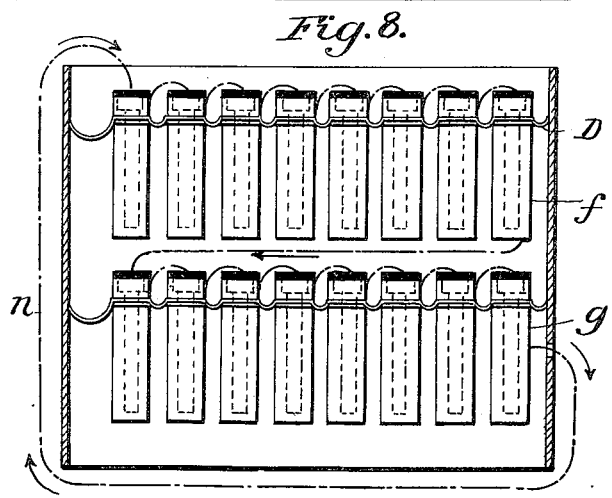

In the accompanying drawings, Figure 1 is a side elevation of one form of cell, the dotted lines indicating the positive element. Fig. 2 is an end view of the same. Fig. 3 is a vertical sectional view of the same, showing under it a source of heat. Fig. 4 is a top view of the same, showing the enlarged base. Fig. 5 is a top view of another form of cell without the enlarged base. Fig. 6 is a side view of the positive element. Fig. 7 is a side view of two sets of elements arranged in a frame. Fig. 8 is an end view of the same, showing one set of electric connections. Fig. 9 is a side view of an automatic fluid-supplying device. Fig. 10 is a section showing a four-way valve in detail; and Fig. 11 is a plan view of a diaphragm for holding the cells, which may be used in connection with the frame shown in Figs. 7 and 8. Fig. 12 is a detail showing the escapement in perspective.

The cell comprises an outer case A, which constitutes one of the elements of the cell, and is made of copper or other suitable material, while in the cell, supported upon an insulating-piece $a$, which serves as a cover for the case, is the other element $e$ of the battery—such, for instance, as zinc or similar material—it being secured to the insulating-piece by screws and nuts $b$ $c$, one of which answers the purpose of a binding-post.

The body of the cell is preferably in the form of a flattened cylinder, somewhat larger than the other element contained within the cell, and of such a shape that the inner portions of the sides of the case are practically at the same distance throughout from the inner element. Sometimes it is desirable to furnish more space in the cell for the liquid, in which case the bottom portion may be enlarged, as indicated at $d$, Figs. 1 to 4, or it may be otherwise shaped to furnish more surface for the liquid and for heating. Some suitable source of heat is provided to maintain the proper temperature of the liquid, and this is indicated in Fig. 3 by the gas-jet G.

I prefer to use an electrolyte containing salts of copper, as sulfate of copper.

In use I prefer to arrange a number of such cells in a suitable frame, and in Figs. 7, 8, and 11 I have illustrated one way of arranging the cells, there being two tiers $f$ $g$ so placed that heat beneath the lower tier will do its work and will then pass upward toward the second tier and be utilized to the best advantage. The cells are preferably supported in a plate D, made of incombustible and non-conducting material, like porcelain, asbestos, &c., and having orifices for the purpose of receiving the cells, and between the cells are gutters or depressions, as shown, for carrying off any fluid which may overflow from the cells. The cells are preferably put through the orifices far enough to extend almost their entire length below said plate, so as to present the largest possible heating-surface, the flame passing in the direction of the arrows shown in Fig. 7.

It will be understood that the cells may be connected in series or otherwise, as may be desired, according to the nature of the current to be produced, and in Fig. 8 I have shown them arranged in series, the vessel constituting the negative element of one cell being connected to the positive element of the next cell and the circuit being completed by the conductor $n$.

Owing to the application of heat, there is considerable evaporation and consumption of the electrolyte, and it is desirable to maintain the level of the electrolyte in the cells as nearly equal as possible under all conditions, and in order to accomplish this I provide an automatic means for supplying the electrolyte, one of which is illustrated in Figs. 9, 10, and 12, in which there is a conductor K, connected to the inner element or electrode, while the conductor l is connected to a terminal M, which passes through and is insulated from the case or outer element or electrode. This circuit may be a branch from the main working circuit of the battery, which is not indicated in the drawings. When the cell is filled with the electrolyte, the circuit will be completed by the current passing from the inner element through the conductor K, magnet O, conductor l, to the terminal M, through the electrolyte, to the outer element or electrode. This energizes the magnet, causing it to draw the armature t toward itself, which armature carries two pins r q on its upper end arranged within the path of the pin p on the wheel V. This wheel is driven through a train of gears from a suitable motor W and is connected with a valve X in the supply-pipe Z.

When the armature t is in the position shown in the drawings, the pin p on the wheel V bears against the pin r on the armature and the parts are held in position, but when the magnet O is energized the pin r is withdrawn from the pin p, allowing the wheel V to make substantially one revolution, when the pin p will impinge upon the pin q on the armature and the motor mechanism be stopped. This will move the valve sufficiently to cut off the supply of fluid to the cell.

When the fluid falls below the terminal M in the cell, the circuit is broken through the conductors K l, including the magnet O and the terminal M, and the spring u retracts the armature t, releasing the pin p from the pin q, allowing another rotation of the wheel V, until the pin p thereon comes in contact with the pin r on the armature, when the mechanism is stopped, and this movement opens the valve X, allowing the fluid to flow to the cell i through the pipe Z until it rises to the dotted line S, when the circuit is again closed and the flow of fluid stopped, as before. In this way it will be seen that a practically constant amount of liquid will be maintained in the cell.

This automatic mechanism is simply described to show one means of accomplishing the result, and I do not herein specifically claim the construction of this device, as it has been held to present subject-matter for a separate application, but have illustrated it to show the combination of parts comprising my complete invention, it being essential to have some such feeding device in order to produce the best results in connection with the other features of my invention.

From the above it will be seen that my invention comprises a cell in which there is a positive element and a negative element, both in contact with the liquid and one forming the liquid-retainer and serving to support the other element, and these cells are preferably arranged in an incombustible and non-conducting frame to form a battery and are provided with means for maintaining the supply of electrolyte, as well as with means for heating the electrolyte to a degree sufficient for the depolarization of the cells.

I have found that the application of heat to a cell of this description is of great advantage in the way of economy, in that I am enabled to produce an increased current from a cell of the same character to which the heat is not applied. The reason for this, I believe, is that the action of the heat neutralizes the effect of the hydrogen globules which ordinarily form on the negative pole of the generator, preventing polarization, and, further, the heat reduces the internal resistance of the electrolyte. Thus by reducing the resistance and preventing polarization of the cell I am enabled to get far greater efficiency in the way of generating current and at less expense.

What I claim is—

1. As an electric generator, a single fluid-cell comprising an external conducting vessel, an element of a more positive metal inserted therein, an electrolyte containing a salt of copper, a holder containing a supply of said salt of copper, means for feeding said salt to said electrolyte as required, and means for externally heating the cell, substantially as described.

2. As an electric generator, a conducting cup or vessel having flat parallel sides, an element of more positive metal inserted therein, an electrolyte containing a salt of copper, a holder containing a supply of said salt of copper, means for feeding said salt to said electrolyte as required, and means for externally heating the cell, substantially as described.

3. The combination with a frame, of an incombustible and non-conducting supporting-plate provided with orifices for receiving and holding battery-cells and provided with gutters, and an external source of heat, substantially as described.

In testimony that I claim the foregoing as my invention I have signed my name, in presence of two witnesses, this 13th day of May, 1896.

SAMUEL V. ESSICK.

Witnesses:
THOMAS A. WARD,
SAMUEL M. PETTIT.